United States Patent [19]

Miller

[11] Patent Number: 4,702,051
[45] Date of Patent: Oct. 27, 1987

[54] SIZE-ADJUSTABLE WINDOW INSERT ASSEMBLY

[76] Inventor: Clarence W. Miller, 111 Cedar La., Bourbonnais, Ill. 60914

[21] Appl. No.: 760,274

[22] Filed: Jul. 29, 1985

Related U.S. Application Data

[63] Continuation-in-part of Ser. No. 605,616, Apr. 30, 1984, abandoned.

[51] Int. Cl.[4] .............................................. E06B 3/26
[52] U.S. Cl. ...................................... 52/202; 52/217; 52/656; 49/505; 403/402
[58] Field of Search ................ 52/126.1, 126.3, 126.6, 52/202, 203, 209, 211–214, 302, 401, 402, 475, 476, 656, 769, 822, 823, 824, 397–399, 217; 49/62, 505; 403/295, 402

[56] References Cited

U.S. PATENT DOCUMENTS

| | | | |
|---|---|---|---|
| 1,432,565 | 10/1922 | Malec | 52/476 |
| 2,397,803 | 4/1946 | Murray et al. | 52/202 |
| 2,443,548 | 6/1948 | Wilson | 52/126.3 |
| 2,743,487 | 5/1956 | Kuhlman | 52/402 |
| 2,848,762 | 8/1958 | Peterson | 52/402 |
| 2,905,982 | 9/1959 | Lenke | 52/203 |
| 2,996,767 | 8/1961 | Kobil et al. | 52/214 |
| 3,429,601 | 2/1969 | Bremmers | 52/476 |
| 3,442,059 | 5/1969 | Kessler | 52/475 |
| 3,510,985 | 5/1970 | Smits | 52/656 |
| 4,076,438 | 2/1978 | Bos | 403/202 |
| 4,160,348 | 7/1979 | Chapman et al. | 52/202 |
| 4,187,657 | 2/1980 | Sukolics | 52/769 |
| 4,295,305 | 10/1981 | Shelver | 52/202 |
| 4,333,272 | 6/1982 | Eastman | 49/505 |
| 4,372,082 | 2/1983 | Pagel | 49/62 |
| 4,453,346 | 6/1984 | Powell et al. | 49/404 |
| 4,453,855 | 6/1984 | Richter et al. | 52/202 |
| 4,462,186 | 7/1984 | Fuller | 49/463 |
| 4,502,260 | 3/1985 | Machler | 52/202 |

FOREIGN PATENT DOCUMENTS

| | | | |
|---|---|---|---|
| 1028569 | 3/1978 | Canada | 52/475 |
| 97006 | 9/1963 | Denmark | 52/769 |
| 2522067 | 12/1975 | Fed. Rep. of Germany | 52/126.3 |
| 2623752 | 12/1976 | Fed. Rep. of Germany | 403/295 |
| 2835154 | 2/1980 | Fed. Rep. of Germany | 403/402 |
| 2313536 | 2/1977 | France | 52/202 |
| 2461884 | 3/1981 | France | 52/745 |

*Primary Examiner*—John E. Murtagh
*Assistant Examiner*—Andrew Joseph Rudy
*Attorney, Agent, or Firm*—Willian Brinks Olds Hofer Gilson & Lione Ltd.

[57] ABSTRACT

A window insert assembly is disclosed having a spring-biased frame construction used to secure the insert within existing window frames of varying size. The insert assembly is particularly useful for mounting interiorly of an existing window pane to form a "double pane" insulative window structure, i.e., by creating a thermal cavity between the interior side of the existing window pane and the window pane of the insert. The insert assembly comprises a solid pane, such as a glass pane, mounted in a first frame. The first frame is received within a second frame which has movable sides for changing the size of the second frame. Springs are provided between the second frame and the first frame, preferably on all four sides of the rectangular window insert assembly, which bias the second frame outwardly relative to the first frame. The size of the second frame is adjustable by pressing one or more sides against this bias to fit the insert within an existing window frame in which it is to be installed. Once in place within the window frame, the second frame is released. The spring bias presses the second frame sides into engagement with the window frame, creating a compression fit between the insert assembly and the window frame. The window insert assembly is readily installed without any tools, and is adjustable to fit varying size window frames.

1 Claim, 8 Drawing Figures

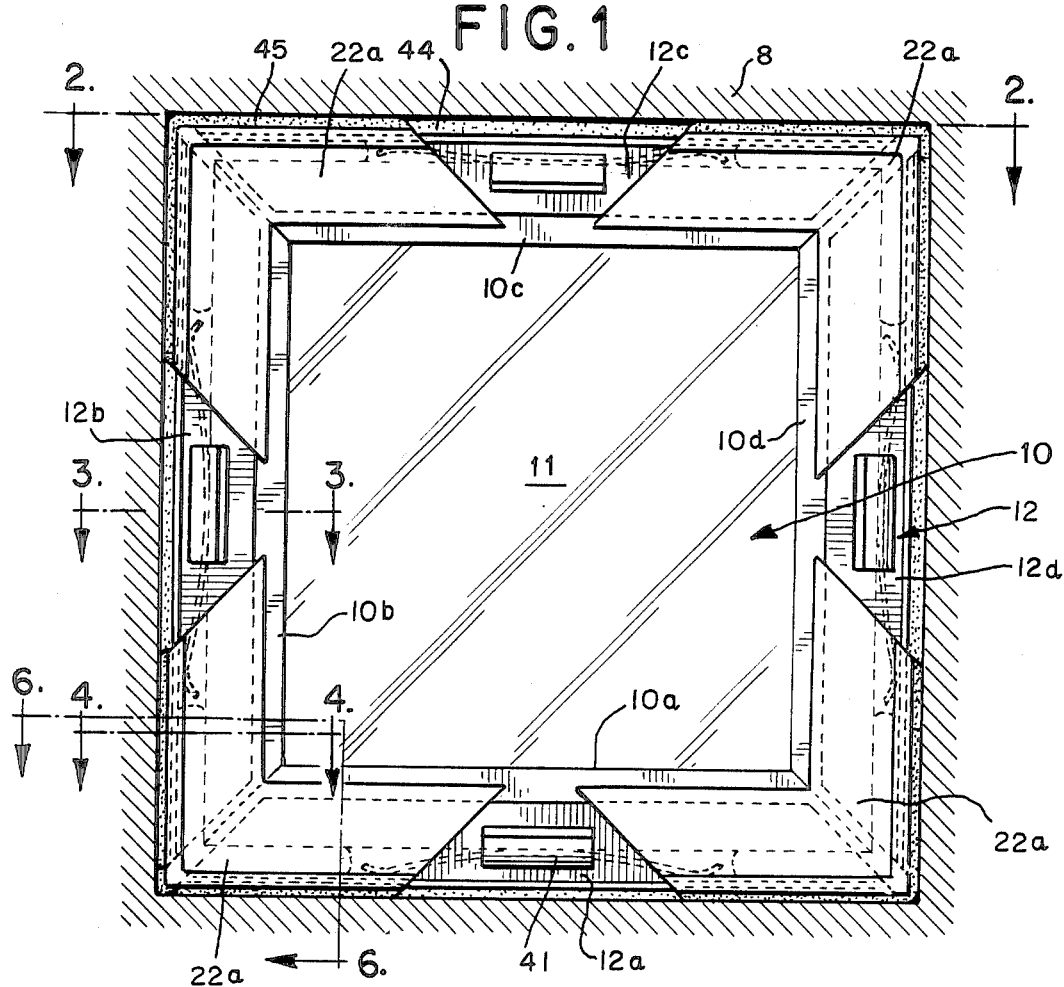
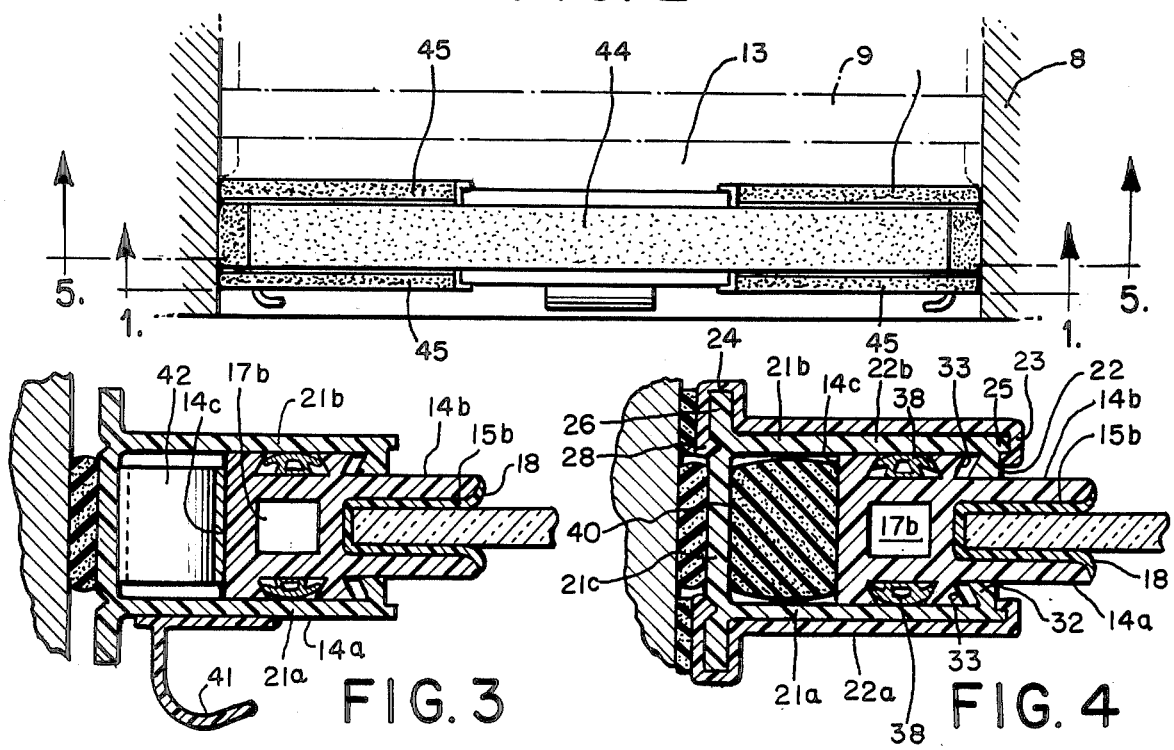

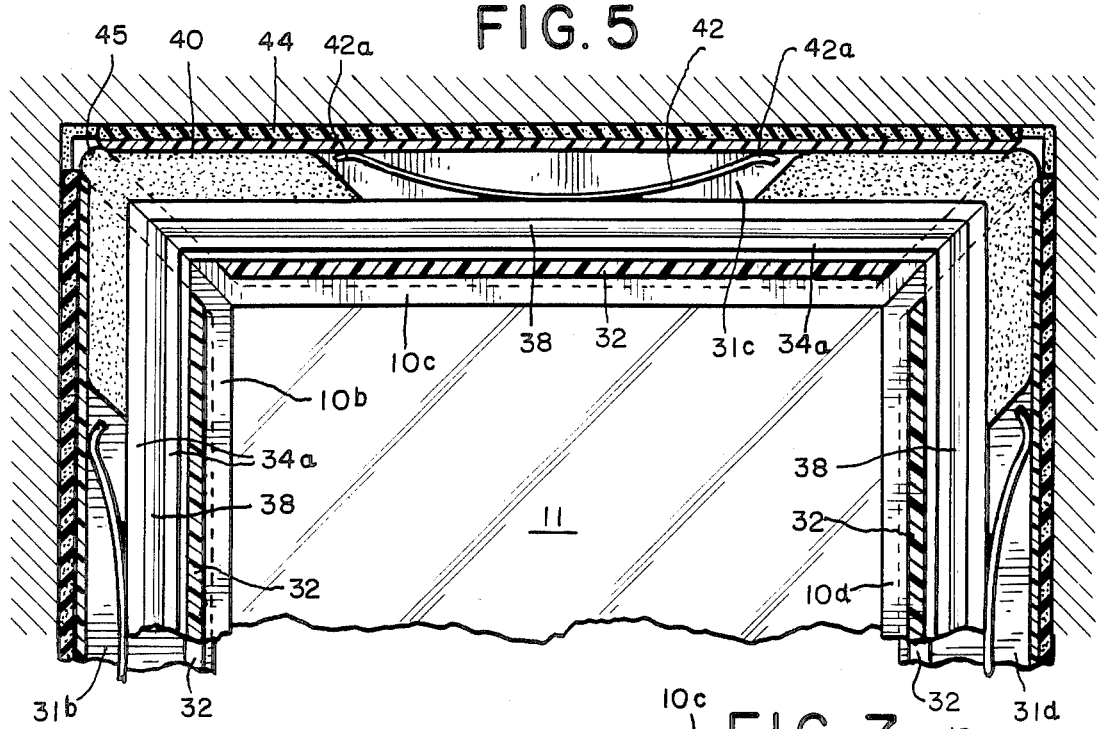
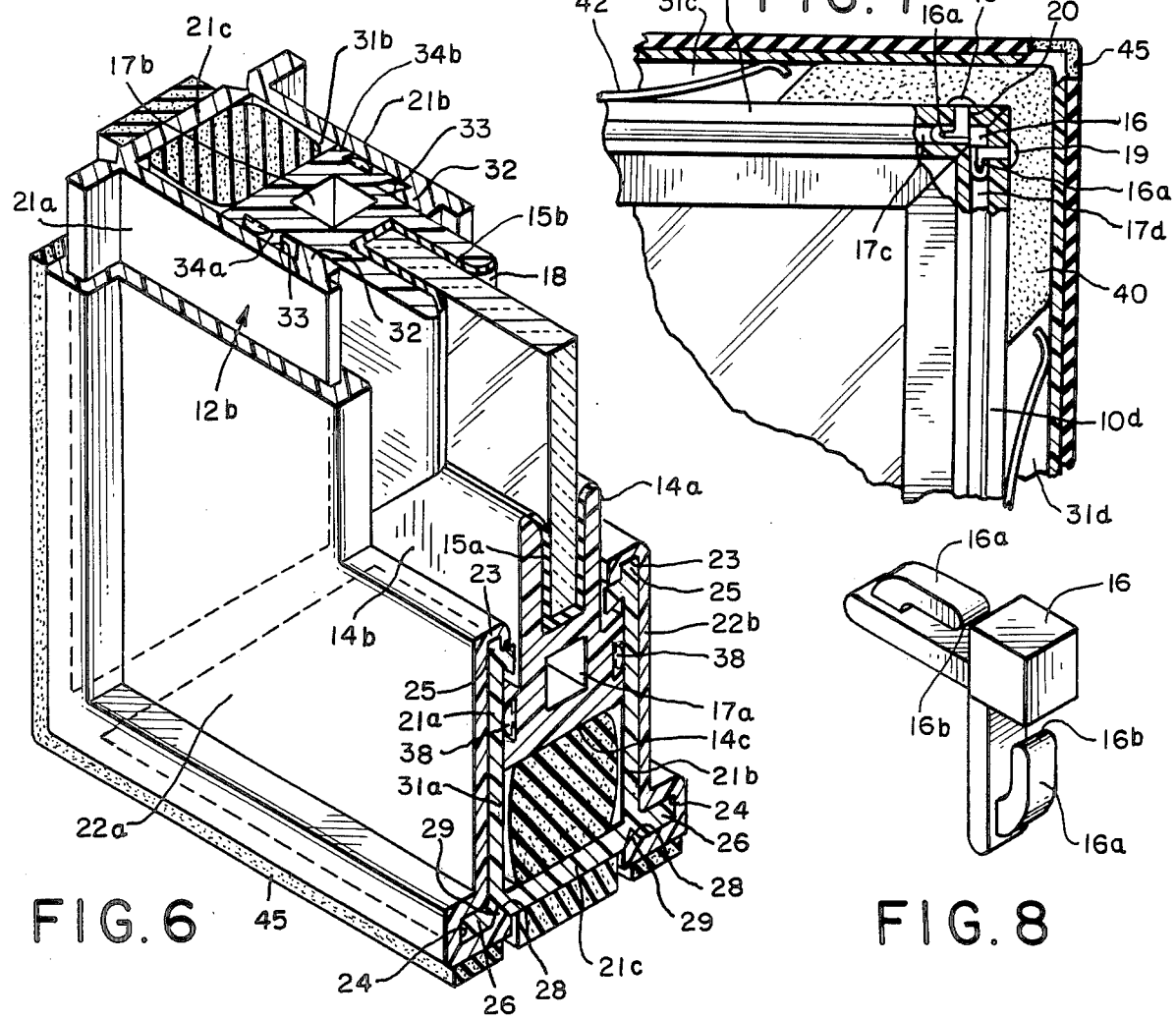

SIZE-ADJUSTABLE WINDOW INSERT ASSEMBLY

RELATED PATENT APPLICATION

This is a continuation-in-part of Ser. No. 605,616 filed Apr. 30, 1984, now abandoned, entitled "Interior Insulating Windows."

FIELD OF THE INVENTION

This invention is generally related to window inserts which are mountable in an existing window frame, and more particularly to a window insert assembly having a solid pane, such as glass, which is mountable next to an existing window to thereby provide a "double-paned" thermally insulative window structure.

BACKGROUND OF THE INVENTION

The single greatest source of energy loss in a building is generally considered to be through the window areas. This is caused in large part by conductive heat transfer through glass window panes, i.e., heat transmitted from one side of the glass pane to the other. Air movement through gaps that may exist between the window elements, such as between the window pane and sash, also contribute to heat transfer through the window area. Energy loss through the window areas from such a temperature and/or pressure gradient existing between the inside and outside of the windows is particularly aggravated in older buildings, such as older homes, having single-pane windows which have become loosely fitted in their sashes with age and use.

It is known that heat conduction can be greatly inhibited through the use of two thicknesses of glass with an air space or gap formed between the two glass panes. This air gap forms an insulative barrier between the two glass panes.

Efforts have been made to insulate existing windows by adding an additional pane of glass to that already in place in the original window structure. Some of these attempts have taken the form of factory-manufactured insulated window units, which can only be installed in certain kinds of window frames, typically require professional installation, and are generally not well suited for cost efficient residential use, in particular. Exterior aluminum storm windows are available, but also require substantial installation effort, are considered to be unattractive, may provide little or no insulating value, and constitute only a minor barrier to air infiltration.

Rigid window units of the foregoing types are, in general, also not readily adjustable to accommodate varying window frame dimensions, even in "standard" window frame sizes.

Non-glass window insulation kits are available which typically constitute a sheet of thin plastic film that can be fastened by tape, magnets, etc. around the outside of a window frame. These latter plastic film thermal "windows" are generally unsightly, require substantial effort to install properly, and typically do not last long.

SUMMARY OF THE INVENTION

It is a principal objective of the present invention to provide a window insert assembly that is readily adjustable without tools to fit within an existing window frame, and which retains itself therein in a manner that effectively seals the insert with the window frame to eliminate, or at least substantially reduce, air infiltration past the insert. It is a particular object of this invention to provide such a window insert assembly for use with an existing window structure to form a thermally insulating air layer sandwiched between a primary window pane and the window insert pane to substantially reduce heat conduction through the window area.

These objectives have been accomplished by the present invention in a size-adjustable window insert assembly that uses a spring-loaded window frame construction for the insert pane which allows the window insert to be compressed to fit the size of an existing window frame opening. When the insert is positioned within the window opening and the compression released, the perimeter of the insert frame assembly is biased into engagement with the window frame to thereby retain the insert in place and seal it with the window frame.

In one form of the invention, the window insert assembly comprises a first frame within which a rigid window pane, such as a glass pane, is mounted. This first frame is carried within a second frame having an inboard facing channel which receives the first frame. The second frame includes at least a pair of frame sections which are movable relative to each other to adjust the size of the second frame, i.e. to increase or decrease its exterior circumference (within limits).

The second frame is biased away from the first frame, such as through the use of springs interposed between the first and second frames. The second frame is thus capable of being compressed inwardly against this bias to adjust the size (circumference) of the second frame.

The second frame would be so compressed when installing the window insert assembly into an existing window frame that is slightly smaller in size than that of the uncompressed second frame. Once positioned in the existing window frame opening, the second frame is released, whereupon the spring bias forces the outboard edge of the second frame into engagement with the inside of the existing window frame to thereby retain the window insert assembly in place. A compressible sealing material is advantageously provided around the outboard edge of the second frame to seal the second frame against the existing window frame to eliminate, or at least substantially prevent, air infiltration past the window insert assembly.

It will thus be seen that the window insert assembly of the present invention is readily installed in an existing window frame without the need of any tools whatsoever.

In a presently preferred form of the invention, the window insert assembly is adapted for installation in a rectangular window opening. Each of the four sides of the second frame are independently movable and are each spring-loaded, i.e. biased away from the adjacent (underlying) first frame side. Each side can thus be independently compressed for installation. Both the height as well as the width of the window insert can therefore be separately varied. The insert will also accommodate existing window frame irregularities and window openings which deviate from a standard rectangular configuration, since each side is capable of being separately angled. Spring loading of all four sides further ensures a good seal between the sealing material provided along the outboard side edge of the window insert and the window frame within which it is installed.

The foregoing objectives, features and advantages of the present invention will be more readily understood upon consideration of the following detailed description of the invention taken in conjunction with the accompanying drawings, in which:

BRIEF DESCRIPTION OF THE DRAWINGS

FIG. 1 is an elevational view of a window insert assembly made in accordance with the present invention shown installed in a window opening;

FIG. 2 is an enlarged sectional view along line 2—2 of FIG. 1 detailing an outboard side of the window insert assembly and indicating its placement relative to an existing window;

FIG. 3 is a sectional view along line 3—3 of FIG. 1;

FIG. 4 is an enlarged sectional view along line 4—4 of FIG. 1;

FIG. 5 is an enlarged partial sectional view along line 5—5 of FIG. 2;

FIG. 6 is a sectional view (in perspective) taken along line 6—6 of FIG. 2, with the window opening frame deleted and a portion of the second (outer) frame cutaway for detail;

FIG. 7 is a fragmentary view which is similar to that of FIG. 5, with a corner of the first (inner) frame broken away for detail; and FIG. 8 is a perspective view of an L used in connecting together the first (inner) frame side elements.

DETAILED DESCRIPTION OF THE INVENTION

Referring first to FIG. 1, the illustrated embodiment of a size-adjustable window insert assembly made in accordance with this invention is generally comprised of a first frame 10 which carries a pane of glass 11, and an adjustable second frame 12 within which the first frame 10 is carried. The adjustability of second frame 12 and its interrelationship with the first frame 10 will be discussed in further detail below. It will be understood at this point, however, that this illustrative window insert assembly is particularly adapted for installation within a pre-existing window opening defined by the window frame 8, i.e., the window opening need not be adapted to receive the window insert assembly.

The invention's most advantageous application to date is as a "second pane" for an original window structure. In such an application (FIG. 2), the window insert assembly forms a double-wall or a double-pane glass window structure in combination with an original (or primary) window pane 9, with a thermally insulative layer of air 13 formed between the two panes. This insulative air layer substantially reduces heat conduction through the window structure caused by a temperature gradient existing between the outdoor and indoor sides of the window. (The window insert assembly is shown in the figures installed adjacent and spaced from the indoor side of the primary window 9.)

As will be more particularly shown, the window insert assembly also forms a barrier against air infiltration through the window structure, thus eliminating, or at least substantially reducing, energy losses from air movement through the window structure.

It will be further understood that while this description of the invention is in the context of a window insert adapted for use as such a "thermal barrier," the window insert assembly may be advantageously used as a primary window (i.e., used by itself).

The first frame 10 is comprised of four side elements 10a–10d (FIG. 1). A mitered joint is used in connection of the side elements 10a–10d to form the rectangular shaped first frame 10. An inboard opening glazing channel that receives the glass pane 11 therein is formed in the first frame by channels provided in each of the side elements 10a–10d, two of such channels 15a and 15b being particularly shown herein. A gasket material 18 is provided in this glazing channel for a firm, substantially air-tight fit between pane 11 and frame 10.

A snap-fit interconnection is used for assembling the side elements 10a–10d together and around the glass pane 11. An L or corner-key 16 (FIGS. 7 and 8) having a resilient catch portion 16a formed on the outboard facing sides of each leg of the L is used in connection of each of the frame corners. These L's 16 are commonly available, such as supplied by Allmetal, Inc., 755 Busse Road, Bensenville, Ill. 60106. Each leg of an L 16 fits into a respective longitudinally extending channel 17a–17d at the ends of adjacent side elements 10a–10d. These channels 17a–17d extend below the respective glazing channels 15a–15d.

The side elements 10a–10d are locked together using the L's 16; this is particularly illustrated in FIG. 7 in regard to one frame corner, and described below. It will be understood that all of the first frame elements 10a–10d are joined in a like manner.

With reference now to FIG. 7, each of the legs of an L 16 is locked into a respective longitudinal channel 17c, 17d through the action of the catch portion 16a engaging with a respective shoulder formed within the longitudinal channels 17c, 17d. Each shoulder herein takes the form of a portion of a pop rivet 19 which extends into a respective channel 17c, 17d through an associated aperture 20 formed through the outboard sides 14c of the first frame side elements 10c, 10d. Each pop rivet 19 is spaced inwardly from the end of a respective side element 10c, 10d a sufficient distance to allow a leg of the L 16 to be inserted into a longitudinal channel (e.g., 17c, 17d) such that the catch portion 16a completely passes over the portion of the pop rivet 19 which extends into the longitudinal channel, with the edge 16b of the catch then engaging with the far side of the pop rivet 19. Each leg of an L 16 is thus locked into position in a respective longitudinal channels 17c, 17d to join adjacent mitered side elements 10c, 10d in a flush fit. It will thus be seen that all of the side elements 10a–10d can be readily assembled around the glass pane 11 through this snap-fit interconnection.

The assembled first frame 10 is carried within the size-adjustable second frame 12. The second frame 12 is generally comprised of side elements 12a–12d which are joined together in a rectangular shape. The side elements 12a–12d each have a pair of lateral side-walls 21a, 21b and an outboard facing sidewall 21c. Corner element pairs 22a, 22b (FIGS. 1, 4 and 6) are additionally provided within which adjacent side elements 12a–12d are received. While these corner element pairs 22a, 22b are largely cosmetic, they also contribute to the effectiveness of the air seal between the window insert and the window frame 8, as will be shown herein.

As best shown in FIGS. 4 and 6, tongue and groove connections are used between the corner elements 22a, 22b and the second frame side elements 12a–12d. This enables the side elements 12a–12d to slide along their respective longitudinal axes relative to the corner element pairs 22a, 22b to thereby expand or contract the circumference of the second frame 12.

More particularly, a U-shaped channel 23 is formed along one side edge of each corner element 22a, 22b with another channel 24 formed along the opposite side edge of the corner element. Flange or tongue portions 25, 26 formed along the sides 21a, 21b of each second frame side element 12a–12d are received within respective channels 23, 24.

In order to lock a tongue 26 within a channel 24, a second tongue and groove connection is provided for each corner element 22a, 22b in this area. This is comprised of V-shaped grooves 28 formed along the outboard facing wall 21c of each side element 12a–12d within which is received a correspondingly shaped tongue 29 of a respective corner element 22a, 22b. The tongue 29 extends along the interior side of the outboard leg of the U-shaped channel 24 formed in each corner element 22a, 22b.

Each of the second frame side elements 12a–12d has a respective U-shaped channel 31a–31d formed therein by its opposed lateral sidewalls 21a, 21b and outboard sidewall 21c. When the second frame side elements 12a–12d are assembled with the corner element pairs 22a, 22b, a continuous U-shaped channel is thus formed around the inboard side of the second frame 12. It is within this second frame channel (31a–31d) that the first frame 10 is carried.

The second frame side element channels 31a–31d have a lateral width which is approximately the same or slightly greater than the maximum lateral width of the first frame side elements 10a–10d (each of which is received in a respective channel 31a–31d). The first frame 10 is captured within the channels 31a–31d of the second frame 12 by opposed flanges 32 which extend longitudinally along the interior of the sidewalls 21a, 21b of each of the second frame side elements 12a–12b. These flanges 32, which are continuous, engage respective shoulders 33 which extend longitudinally along the outside of the lateral sides 14a, 14b of the first frame side elements 10a–10d. The shoulders 33, which are also continuous, are formed by lateral extensions 34a, 34b of first frame sides 14a, 14b.

The channels 31a–31d have a sufficient depth to permit a respective first frame side element 10a–10d to move toward and away from the outboard sidewall 30c of a respective side element 12a–12d. Viewed in alternative fashion, each of the second side frame elements 12a–12d can move inwardly as well as outwardly relative to the first frame 10. In this regard, the flanges 32 along the inside of the second frame channel (31a–31d) slide along the outside of the first frame 10. Likewise, lateral sidewall extensions 34a, 34b of the first frame 10 slide along the inner sidewalls of the second frame channel (31a–31d). A fairly close fit is maintained between these inwardly/outwardly sliding portions of the respective frames which substantially reduces air passing between the frames 10, 12 from one side of the window assembly to the other side.

An additional seal between the two frames 10, 12 is further provide by resilient strip seals 38, such as tubular rubber strips, which are carried within longitudinal channels 39 formed in each of the lateral sidewall extensions 34a, 34b. It will be understood that the strip seals 38 have a thickness at least slightly greater than that of the depth of the channels 39 so that the seals 38 are compressed between the two frames 10, 12. A further air seal between the frames is further provided in the form of resilient foam pieces 40 which are located in the corners of the second frame channel (31a–31d).

A principal attribute of the invention is the ability to install the window insert assembly in variously sized window openings without tools, and with a good seal between the window insert assembly and the window frame in which it is installed. The adjustability of the present insert has already been illustrated in terms of the ability to move the second frame side elements 12a–12d relative to the first frame 10. Fixing and sealing of the window insert assembly within a primary window frame is accomplished herein by biasing the side elements 12a–12d of the second frame away from the first frame 10. This "spring loading" of the first and second frames is done in this embodiment by inserting one or more leaf springs 42 (FIGS. 1 and 5) in each of the channels 31a–31d between the outboard sidewall 21c of the second frame side elements 12a–12d and the outboard sidewall 14c of the first frame side elements 10a–10d.

The leaf springs 42 are made of spring steel, and have a generally smooth curved shape terminating in feet 42a. The springs 42 are centrally located in the channels 31a–31d, with the feet 42a against the outboard sidewalls 21c of the second frame side elements and the apex of the curve against the outboard sidewalls 14c of the first frame elements. The second frame side elements 12a–12d are thus biased outwardly relative to the first frame 10.

All four sides of the window insert assembly are spring loaded in this fashion. In this regard, it will be noted that adjacent ends of second frame side elements 12a–12d within a respective corner element pair 22a, 22b are spaced from one another. The spacing permits a side element 12a–12d to slide within the corner element pair 22a, 22b when the circumference of the second frame 12 is changed through movement of its adjacent (companion) side element against the respective spring load.

Installation of the window insert assembly is thus readily accomplished by first selecting a window insert which is somewhat larger than the window opening in which it is to be installed. One or more of the second frame side elements 12a–12d are then pressed inwardly (toward first frame 10) to fit the insert assembly within the window opening. The compressed sides are then released, whereupon they then engage with the primary window frame 8 by virtue of the spring bias. One or more handles 41 can be provided on the second frame to facilitate installation and removal of the insert assembly.

To prevent, or at least substantially reduce, air infiltration between the perimeter of the window insert assembly and the primary window frame 8, a resilient layer of sealing material is provided around the outboard side of the second frame 12 (best shown in FIGS. 1, 2 and 5). For example, weather stripping 44 such as felt or resilient foam is adhesively fixed to the exterior of outboard sidewalls 21c of each of the side elements 12a–12d, and extends approximately the entire length of each of these side elements. Thinner strips 45 of such weather stripping is also provided along the outboard side edges of each of the corner elements 22a, 22b. It will be noted that the thicknesses of the weather stripping 44, 45 is preferably adjusted such that a fairly uniform side edge is formed around the outer circumference of the second frame 12.

Upon installation, the weather stripping 44, 45 is compressed against the primary window frame to form a substantially air-tight seal between the window frame and the window insert. The weather stripping further serves to accommodate any surface irregularities in the window frame which it overlies.

The entire window insert assembly of this invention lends itself to quick and efficient manufacture in a variety of basic sizes that accommodate most commonly used window openings. The various pieces making up the first and second frames 10, 12 are advantageously formed of a PVC plastic, which reduces the cost of the window insert assembly.

Thus, while the invention has been described in connection with a certain presently preferred embodiment, those skilled in the art will recognize many modifications to structure, arrangement, portions, elements, materials, and components which can be used in the practice of the invention without departing from the principals of this invention.

What is claimed is:

1. A size-adjustable window insert assembly for use in combination with an existing window structure, the window structure including a window pane carried within a window frame, to thereby form a thermally insulative double-paned window structure, wherein said window insert assembly comprises:

a first rectangular shaped frame with a rigid window pane carried therein, said first frame having an outboard facing side edge defining a first circumference;

a second rectangular shaped frame having an inboard open channel defined therein adapted to receive said first frame outboard facing side edge such that said first frame is surrounded by and carried within said channel with said first and second frames in substantially air-tight engagement, an outboard facing second frame side edge defining a second circumference, said second frame being formed of four elongated side sections, each said side section including a portion of said channel therein, each said section being independently movable inwardly and outwardly relative to said first frame, said first frame being captured within said second frame by flanges formed within each said side section channel that engage shoulders extending from said first frame;

resilient sealing material mounted on said second frame along said second circumference; and a leaf spring located in each channel portion of a respective second frame side section between said outboard facing side edge of said first frame and said second frame, said springs biasing each respective second frame side section away from said first frame, said second circumference being adjustable by pressing one or more side sections of said second frame against its spring bias to thereby reduce said second circumferential size to fit said window insert assembly within an opening defined by a window frame and spaced from an existing window pane therein, and then releasing said compression with said springs forcing said second frame to engage said window frame along said second circumference with a substantially air-tight seal.

* * * * *